(12) United States Patent
Huppi

(10) Patent No.: US 7,168,047 B1
(45) Date of Patent: Jan. 23, 2007

(54) MOUSE HAVING A BUTTON-LESS PANNING AND SCROLLING SWITCH

(75) Inventor: Brian Q. Huppi, San Carlos, CA (US)

(73) Assignee: Apple Computer, Inc., Cupertino, CA (US)

( * ) Notice: Subject to any disclaimer, the term of this patent is extended or adjusted under 35 U.S.C. 154(b) by 444 days.

(21) Appl. No.: 10/157,343

(22) Filed: May 28, 2002

(51) Int. Cl.
*G06F 3/00* (2006.01)
*G06F 3/044* (2006.01)

(52) U.S. Cl. ................................ 715/784; 345/165

(58) Field of Classification Search ............... D14/405; 345/166, 157, 163, 165; 250/221
See application file for complete search history.

(56) References Cited

U.S. PATENT DOCUMENTS

| | | | |
|---|---|---|---|
| 4,866,602 A | 9/1989 | Hall | 710/1 |
| 4,922,236 A * | 5/1990 | Heady | 345/166 |
| 5,125,077 A | 6/1992 | Hall | 710/1 |
| D349,280 S | 8/1994 | Kaneko | D14/410 |
| 5,414,445 A | 5/1995 | Kaneko et al. | 346/163 |
| D362,431 S | 9/1995 | Kaneko et al. | D14/409 |
| 5,473,343 A | 12/1995 | Kimmich et al. | 715/860 |
| 5,473,344 A | 12/1995 | Bacon et al. | 715/860 |
| 5,495,566 A | 2/1996 | Kwatinetz | 715/785 |
| 5,559,943 A | 9/1996 | Cyr et al. | 715/856 |
| 5,565,887 A | 10/1996 | McCambridge et al. | 715/856 |
| 5,578,817 A | 11/1996 | Bidiville et al. | 250/221 |
| 5,596,347 A | 1/1997 | Robertson et al. | 715/856 |
| 5,598,183 A | 1/1997 | Robertson et al. | 715/856 |
| 5,611,040 A | 3/1997 | Brewer et al. | 715/819 |
| 5,611,060 A | 3/1997 | Belfiore et al. | 715/860 |
| D382,550 S | 8/1997 | Kaneko et al. | D14/409 |
| D385,542 S | 10/1997 | Kaneko et al. | D14/409 |
| 5,726,687 A | 3/1998 | Belfiore et al. | 715/785 |
| 5,754,890 A | 5/1998 | Holmdahl et al. | 710/63 |
| 5,786,818 A | 7/1998 | Brewer et al. | 715/822 |
| 5,812,114 A * | 9/1998 | Loop | 345/157 |
| 5,828,364 A | 10/1998 | Siddiqui | 345/163 |
| 5,838,304 A | 11/1998 | Hall | 345/157 |
| D402,281 S | 12/1998 | Ledbetter et al. | D14/402 |
| 5,907,152 A | 5/1999 | Dändliker et al. | 250/221 |
| 5,982,302 A * | 11/1999 | Ure | 341/22 |
| 5,991,431 A * | 11/1999 | Borza et al. | 382/127 |
| 5,999,166 A * | 12/1999 | Rangan | 345/157 |

(Continued)

OTHER PUBLICATIONS

Apple Computer, Inc, "Apple Pro Mouse", Jul. 2000, Apple Pro Mouse Design Innovations product specification, pp. 1-11.*

(Continued)

*Primary Examiner*—Ba Huynh
*Assistant Examiner*—Steven Theriault
(74) *Attorney, Agent, or Firm*—Beyer Weaver & Thomas LLP

(57) ABSTRACT

A mouse for controlling movements on a display screen is disclosed. The mouse includes a housing that is gripped by a user during manipulation of the mouse and a sensor configured to detect the presence of a user's hand or portions thereof located outside of and in close proximity to a predetermined portion of the housing. The signals produced by the sensor are used to control functionalities of the mouse, as for example, switching between a cursor control mode and a scroll/pan control mode of the mouse.

36 Claims, 9 Drawing Sheets

U.S. PATENT DOCUMENTS

| | | | |
|---|---|---|---|
| 6,031,518 A | 2/2000 | Adams et al. | 345/156 |
| 6,075,533 A | 6/2000 | Chang | 715/786 |
| 6,084,574 A | 7/2000 | Bidiville | 345/166 |
| 6,111,563 A * | 8/2000 | Hines | 345/166 |
| 6,124,587 A | 9/2000 | Bidiville et al. | 250/221 |
| 6,128,006 A * | 10/2000 | Rosenberg et al. | 345/163 |
| 6,166,721 A | 12/2000 | Kuroiwa et al. | 345/163 |
| 6,188,393 B1 | 2/2001 | Shu | 345/184 |
| 6,191,774 B1 | 2/2001 | Schena et al. | 345/163 |
| 6,198,473 B1 | 3/2001 | Armstrong | 345/163 |
| 6,211,861 B1 | 4/2001 | Rosenberg et al. | 345/163 |
| D442,592 S | 5/2001 | Ledbetter et al. | D14/402 |
| 6,225,980 B1 | 5/2001 | Weiss et al. | 345/161 |
| D443,616 S | 6/2001 | Fisher et al. | D14/402 |
| 6,243,078 B1 | 6/2001 | Rosenberg | 345/161 |
| 6,297,795 B1 | 10/2001 | Kato et al. | 345/684 |
| 6,513,717 B2 * | 2/2003 | Hannigan | 235/462.45 |
| 6,559,830 B1 * | 5/2003 | Hinckley et al. | 345/157 |
| 6,587,093 B1 * | 7/2003 | Shaw et al. | 345/163 |
| 6,703,599 B1 * | 3/2004 | Casebolt et al. | 250/221 |
| 6,707,027 B2 * | 3/2004 | Liess et al. | 250/221 |
| 6,724,366 B2 * | 4/2004 | Crawford | 345/157 |
| 2001/0011991 A1 | 8/2001 | Wang et al. | |
| 2002/0063688 A1 * | 5/2002 | Shaw et al. | 345/163 |
| 2002/0130841 A1 * | 9/2002 | Scott | 345/166 |
| 2003/0107552 A1 | 6/2003 | Lu | |

OTHER PUBLICATIONS

David Nagel, "More Details on the New Pro Keyboard and ButtonLess Mouse", Jul. 2000, Http://creativemac.com/HTM/News/07_00/detailskeyboardmouse.htm pp. 1-2.*

Joh Siracusa, "MacWorld Expo NY 2000", Jul. 2000, Http://www.arstechnica.com/wanderdesk/3q00/macworld2k/mwny-2.html pp. 1-6.*

Microsoft Inc. et al. "Scroll and zoom on a Microsoft Excel sheet by using the Micrsoft Intellimouse pointing device" 1999. pp. 1-3.*

Ken Hinckley et al. "Touch-Sensing Input Devices" CHI 1999 pp. 223-230.*

"System Service and Troubleshooting Manual", www.dsplib.com/intv/Master, downloaded Dec. 11, 2002.

* cited by examiner

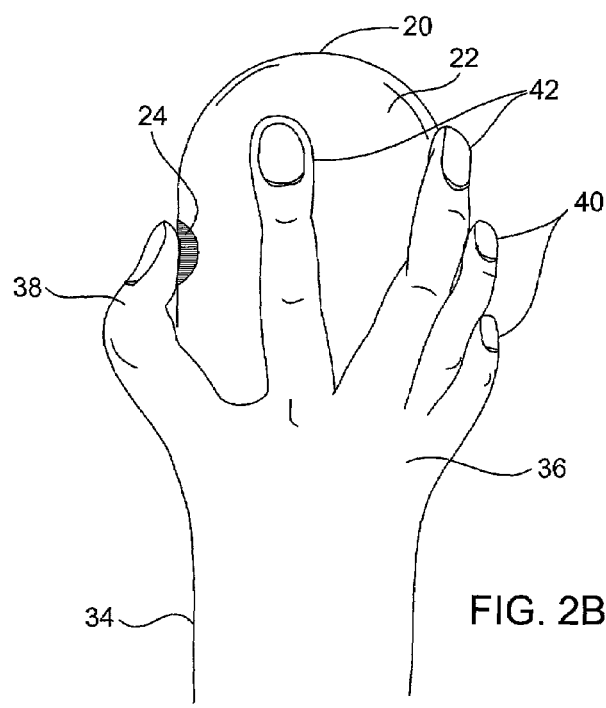
FIG. 2B
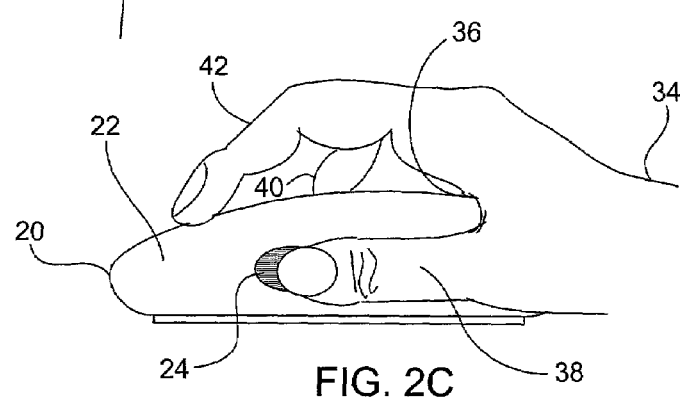
FIG. 2C
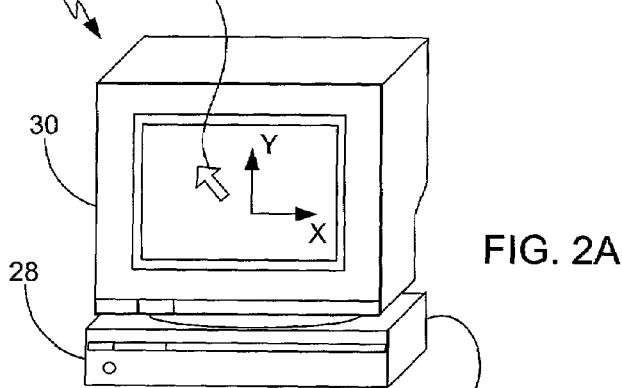
FIG. 2A
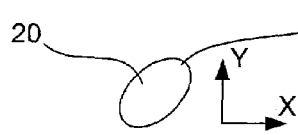

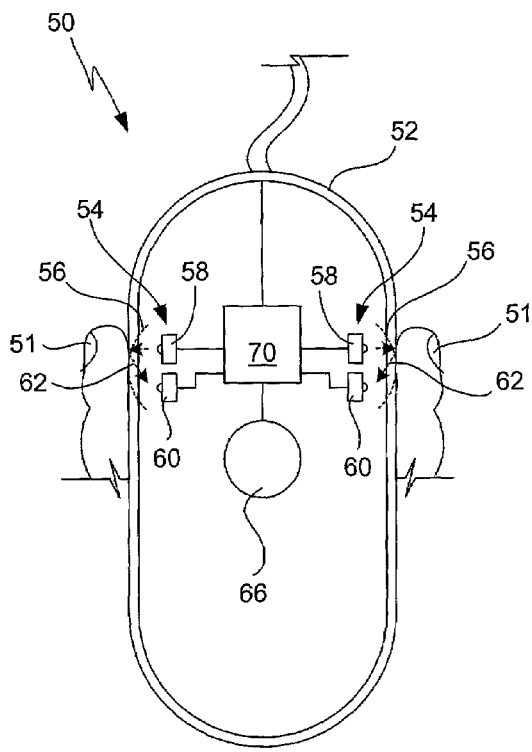
FIG. 4A
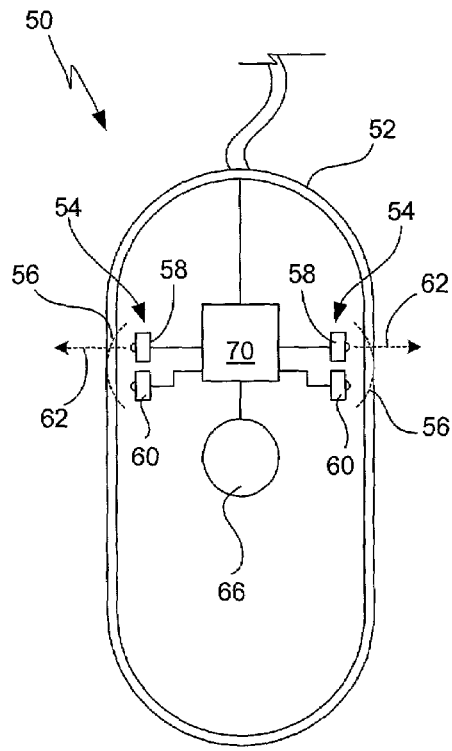
FIG. 4B
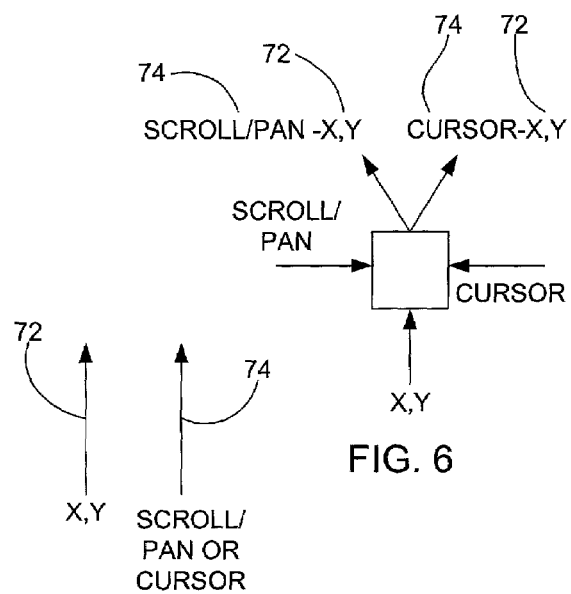
| D1 | D2 | FUNCTION |
|---|---|---|
| 0 | 0 | SCROLL/PAN |
| 0 | 1 | CURSOR |
| 1 | 0 | CURSOR |
| 1 | 1 | CURSOR |
FIG. 7
FIG. 6
FIG. 5

MOUSE HAVING A BUTTON-LESS PANNING AND SCROLLING SWITCH

BACKGROUND OF THE INVENTION

1. Field of the Invention

The present invention relates generally to a mouse. More particularly, the present invention relates to mice having a button-less switch.

2. Description of the Related Art

Most computer systems, as for example general purpose computers such as portable computers and desktop computers, receive input from a user via an input device such as a mouse. As is generally well known, the mouse allows a user to move an input pointer (e.g., cursor) and to make selections with respect to a graphical user interface (GUI). The mouse generally includes a trackball, which is located on the underside of the mouse and which rolls when the mouse moves thus translating the motion of the users hand into signals that the computer system can use. The movement of the trackball generally corresponds to the movement of the input pointer. That is, by positioning the mouse on a desktop and moving it thereon, the user can move the input pointer in similar directions with respect to the GUI. An optical sensor may alternatively be used to track the movement of the mouse. The mouse also conventionally includes one or more buttons, which are located on the top side of the mouse housing. These one or more buttons, when selected, can initiate a GUI action such as menu or object selections. The one or more buttons are typically provided by on or more button caps that move relative to the mouse housing.

Recently, a scroll wheel has been added to the mouse to give the user scrolling functionality. The scroll wheel saves time and steps, and allows a user to move through documents by simply rolling the wheel forward or backward-instead of clicking on the scroll bar displayed on the GUI. In the past, scrolling was implemented by selecting the scroll bar displayed on the GUI with the mouse, and moving the scroll bar on the GUI by moving the mouse up or down. In some circumstances, a button, in combination with software has been used to switch the mouse motion from tracking to scrolling or panning. Both the scroll wheel and button are located outside the mouse, i.e., break the surface of the mouse.

Although mice designs such as these work well, there are continuing efforts to improve their form, feel and functionality.

SUMMARY OF THE INVENTION

The invention relates, in one embodiment, to a mouse for controlling movements on a display screen. The mouse includes a housing that is gripped by a user during manipulation of the mouse. The mouse also includes a sensor configured to detect the presence of a movable object located outside of and in close proximity to a predetermined portion of the housing.

The invention relates, in another embodiment, to a computer mouse configured to identify the manner in which the computer mouse is being held by a user.

The invention relates, in another embodiment, to a mouse having a panning and scrolling switch based on infrared sensing technology.

The invention relates, in another embodiment, to a mouse for controlling movements and performing actions on a graphical user interface of a display screen. The mouse includes a housing that provides a structure for moving the mouse along a surface and for gripping the mouse for movement thereof. The housing has a light passing portion. The mouse also includes a tracking assembly disposed at least in part inside the housing and configured to track movements of the mouse along a surface. The movements of the mouse are used to control cursor movements and scroll/pan movements through the graphical user interface. The mouse additionally includes a switch assembly disposed inside the housing and configured to switch the mouse between a cursor control mode, where movements of the mouse are used to control movements of a cursor, and a scroll/pan control mode, where movements of the mouse are used to control scroll or pan movements. The switch assembly includes an optical sensor configured to detect the presence of a user's hand through the light passing portion of the housing so as to activate one of the GUI movements (e.g., cursor movements and scroll/pan movements).

The invention relates, in another embodiment, to a method of switching between modes of a mouse that is manipulated by the hand of a user. The method includes receiving a first data associated with a first hand position. The method also includes implementing a first mode of the mouse based on the first data. The method additionally includes receiving a second data associated with a second hand position. The method further includes implementing a second mode of the mouse based on the second data.

BRIEF DESCRIPTION OF THE DRAWINGS

The invention will be readily understood by the following detailed description in conjunction with the accompanying drawings, wherein like reference numerals designate like structural elements, and in which:

FIGS. 2A–2C show the mouse of FIG. 1 in a cursor control mode, in accordance with one embodiment of the present invention.

FIGS. 4A and 4B are a simplified top view, in cross section, of a mouse, in accordance with one embodiment of the present invention.

FIG. 5 is a simplified diagram showing signals produced by a mouse, in accordance with one embodiment of the present invention.

FIG. 6 is a simplified diagram show ing signals produced by a mouse, in accordance with one embodiment of the present invention.

FIG. 7 is a function diagram, in accordance with one embodiment of the present invention.

DETAILED DESCRIPTION OF THE INVENTION

The invention generally pertains to a mouse having a button-less switch for implementing a function such as tracking, scrolling, panning and or the like. By buttonless it is meant that the function is implemented without adding buttons, wheels or other mechanical actuators that break the outer surface of the mouse (e.g., scroll wheel, scroll button). In one particular case, the button-less switch allows a user to switch between tracking (e.g., moving a cursor with a mouse) and scrolling/panning (e.g., moving the contents of a window up/down or side to side). For example, when a user wants to scroll or pan, the user can switch the mode of the mouse such that further movement of the mouse results in scrolling or panning rather than tracking.

Embodiments of the invention are discussed below with reference to FIGS. 1–12. However, those skilled in the art will readily appreciate that the detailed description given herein with respect to these figures is for explanatory purposes as the invention extends beyond these limited embodiments.

Figure 1:
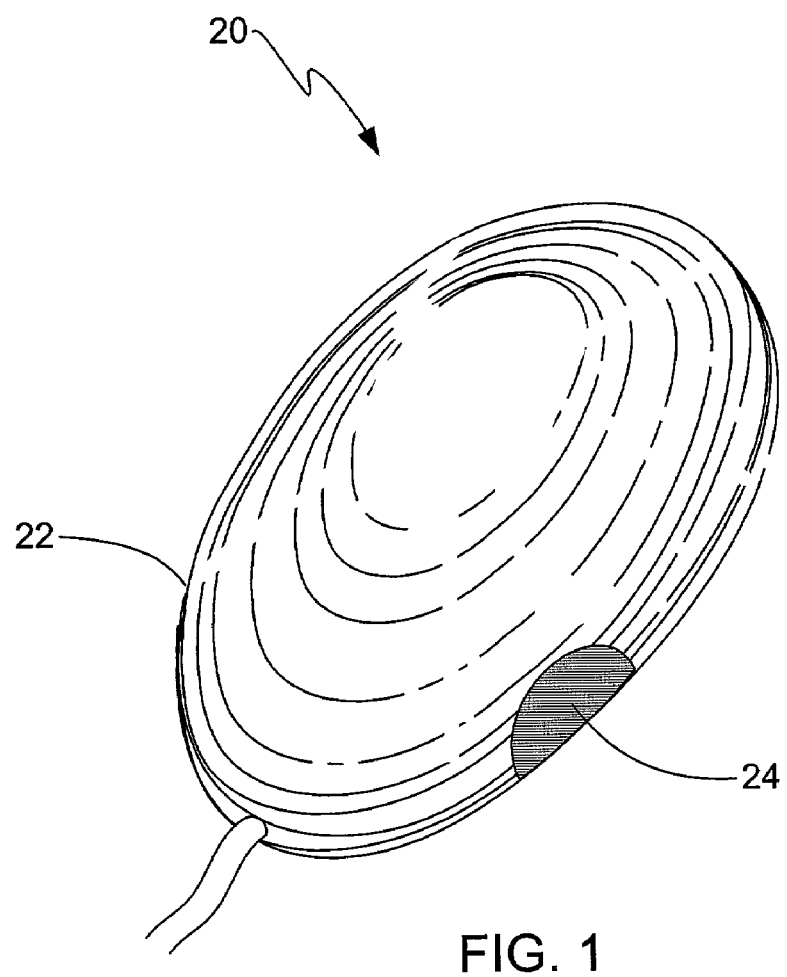
FIG. 1 is a perspective diagram of a mouse, in accordance with one embodiment of the present invention.

FIG. 1 is a perspective diagram of a mouse 20, in accordance with one embodiment of the invention. The mouse 20 is handheld device for controlling movements and/or performing actions on a graphical user interface of a display screen. The mouse 20 generally includes a housing 22 that provides a structure for moving the mouse 20 along a surface and for gripping the mouse 20 for movement thereof (see FIGS. 2 and 3). The housing 22 also provides a structure for enclosing, containing and/or supporting the internal components of the mouse 20. By way of example, the internal components may correspond to a track ball or optical assembly for monitoring the movement of the mouse 20 along a surface and other circuitry for sending signals corresponding to the movements to a host system (e.g., computer system). The housing 22 also helps to define the shape or form of the mouse 20. That is, the contour of the housing 22 embodies the outward physical appearance of the mouse 20. The contour may be rectilinear, curvilinear or both. In most cases, a bottom side of the housing has an external contour that substantially conforms to the contour of a flat surface such as a desktop. In addition, a top side of the mouse housing generally has an external contour that substantially conforms to the contour of the inside surface of a hand.

The mouse 20 is configured to provide positional information, which corresponds to the movement of the mouse 20 along a surface, to a host system. The positional information may be used to control the movement of a cursor/pointer on a graphical user interface (GUI) of a display screen or to scroll or pan through a graphical user interface (GUI) of a display screen. The positional information is generally provided by the trackball or optical assembly mentioned above. The mouse is also configured to provide command information, which informs the host system as to which of the GUI movements (e.g., cursor or scroll/pan) to implement when the mouse is moved along the surface. The command information is generally provided by a switch arrangement that is actuated by the user during manipulation of the mouse, i.e., the user may switch between cursor movements and scroll/pan movements.

In one embodiment, the switch arrangement provides one or more modal areas 24 that represent regions of the mouse housing 20 that may be actuated by a user so as to switch between the GUI movements (cursor/pointer or scroll/pan). The switch arrangement is generally configured to activate the different GUI movements when the hand is positioned proximate or away from the modal areas 24. For example, the switch arrangement may activate the cursor movements when the hand is positioned proximate the modal areas 24 and it may activate the scroll/pan movements when the hand is positioned away from the modal areas 24 (or vice versa). In this manner, different hand positions may be used to initiate the different GUI movements.

The position of the modal areas 24 relative to the mouse housing 22 may be widely varied. For example, the modal areas 24 may be positioned almost anywhere (e.g., top, side, front, or back) on the mouse housing so long as they are accessible to a user during manipulation of the mouse 40. In the illustrated embodiment, the modal area 24 is positioned in the region of the mouse housing 22 that is typically used to grip the mouse (e.g., sides). As should be appreciated, the sides are generally gripped by the thumb and ring/pinky fingers. The number of modal areas 24 may also be widely varied. That is, although only one modal area 24 is shown in FIG. 1, it should be noted that a plurality of modal areas may be used. The plurality of modal areas may be arranged to work together or independent of one another (e.g., separate switches).

In one implementation, each of the modal areas 24 are provided by a sensor of the switch arrangement, i.e., the modal areas 24 represent the working area of the sensor. The sensors are configured to detect the presence of the hand proximate the modal areas 24. The sensors are also configured to produce a first signal when the presence of a hand is detected and a second signal when the presence of a hand is not detected. These signals provide the mouse 20 (or host device) with the command information that may be used to switch between the GUI movements. The sensors may be widely varied. For example, optical sensors, capacitance sensors, and the like may be used.

In one particular embodiment, optical sensors are used. In this embodiment, the optical sensors are located within the mouse housing, and the mouse housing has light passing portions close to the optical sensors that allow the optical sensors to work through the housing. The light passing portions may be formed from a translucent or semi-translucent material or from a material that is filtered so as to allow only certain spectrums of light (e.g., infrared) therethrough. Furthermore, the light passing portions may cover the entire housing or only a small portion as for example a portion in front of the sensors (e.g., modal areas).

The mouse 20 may also include one or more buttons that provide a clicking action for performing actions on the display screen. By way of example, the actions may include selecting an item on the screen, opening a file or document, executing instructions, starting a program, viewing a menu, and/or the like. The buttons may be widely varied. For example, the buttons may be mechanical buttons that are disposed in the housing or a unified button/housing that incorporates the functionality of a button (or buttons) directly into the mouse housing 22. The buttons of the mouse 20 may also be a combination of the above (e.g., mechanical buttons and unified button housing). In the illustrated embodiment, the clicking action is provided by a unified button housing and thus there are no separate mechanical buttons.

FIGS. 2A–C show the mouse in a cursor control mode, in accordance with one embodiment of the invention. FIG. 2A is a perspective diagram of a computer system 26 that includes a general purpose computer 28 to which a display 30 and the mouse 20 are operatively connected. FIG. 2B is a top view and FIG. 2C is a side view showing a user's hand 34 manipulating the mouse 20.

Referring first to FIG. 2A, the cursor control mode of the mouse 20 generally allows a user to move a pointer 32 on the screen of the display 30. The movement of the input pointer 32 corresponds to the relative movements of the mouse 20 as the user moves the mouse along a surface. In most cases, a Cartesian coordinate system is used to monitor the position of the mouse 20 as it is moved. The Cartesian coordinate system is generally defined as a two dimensional coordinate system in which the coordinates of a point (position of the mouse) are its distances from two intersecting, often perpendicular straight lines, the distance from each being measured along a straight line parallel to each other. For example, the X and Y positions of the mouse may be monitored. When moved, the multiple X and Y positions that are generated provide X, Y information for locating and moving the input pointer 32 on the display 30.

Referring to FIGS. 2B and 2C, the cursor control mode of the mouse 20 is actuated when the user's hand 34 is positioned over the modal area 24 of the mouse 20. To elaborate, the palm side surface 36 of the hand 34 is placed on the back portion of the housing 22 and the thumb 38 and two rightmost fingers 40 (or leftmost fingers if left handed) are used to grip the sides of the housing 22. The two remaining fingers 42 (either by themselves or in combination) are used to manipulate the clicking action of the unified button housing 22. In this particular implementation, the switch arrangement is configured to activate the cursor control mode when the thumb 38 is positioned over the modal area 24. For example, the sensor of the switch arrangement detects the presence of the thumb 38 and in response to the detected thumb, the mouse 20 (or general purpose computer 28) converts the position information of the tracking mechanism into cursor/pointer position information.

It should be noted that the hand position shown in FIGS. 2B–2C is not a limitation and that it may vary according to the specific needs of each device or user of the device. For example, it should be appreciated that any hand position may be used to initiate the cursor control mode so long as some portion of the hand (or some other object) is placed proximate the modal area. By way of example, any of the fingers, as well as palm or back side of the hand may be used to initiate the cursor control mode via the modal areas.

Figure 3B:
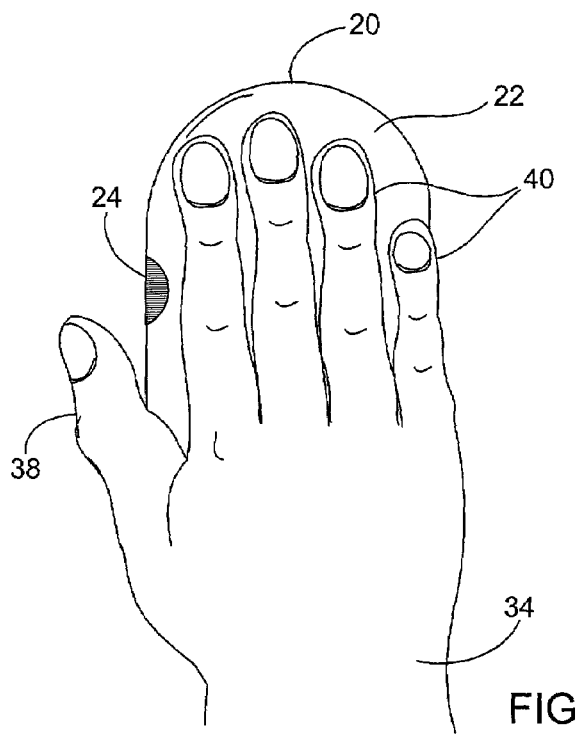
FIGS. 3A–3C show the mouse of FIG. 1 in a pan/scroll control mode, in accordance with one embodiment of the present invention.
Figure 3C:
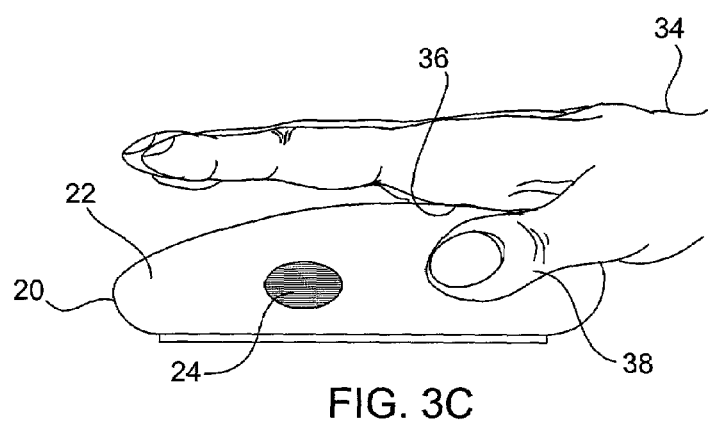
Figure 3A:
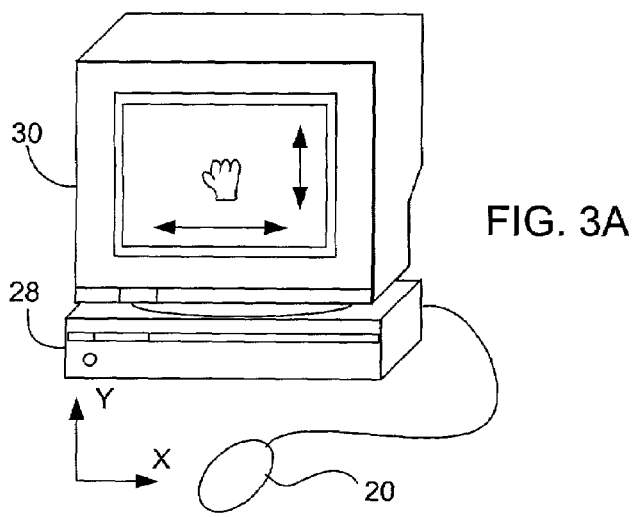

FIGS. 3A–C show the mouse 20 in a scroll/pan control mode, in accordance with one embodiment of the invention. FIG. 3A is a perspective diagram of the computer system 26 that includes the general purpose computer 28 to which a display 30 and the mouse 20 are operatively connected. FIG. 3B is a top view and FIG. 3C is a side view showing a user's hand 34 manipulating the mouse 20.

Referring first to FIG. 3A, the scroll/pan control mode of the mouse 20 generally allows a user to scroll or pan through the screen of the display 30. The direction that the mouse 20 moves generally controls the direction of scrolling/panning. The term "scrolling/panning" as used herein generally pertains to moving displayed data or images (e.g., text or graphics) across a viewing area on a display screen so that a new set of data or image (e.g., line of text or graphics) is brought into view in the viewing area. In most cases, once the viewing area is full, each new set of data appears at the edge of the viewing area and all other sets of data move over one position. That is, the new set of data appears for each set of data that moves out of the viewing area. In essence, scrolling/panning allows a user to view consecutive sets of data currently outside of the viewing area. The viewing area may be the entire viewing area of the display screen or it may only be a portion of the display screen (e.g., a window frame).

Scrolling may be implemented vertically (up or down) or horizontally (left or right). For example, the mouse may be arranged to move the GUI or portions thereof vertically up when moved forward, and vertically down when moved backwards. In addition, the mouse may be arranged to move the GUI or portions thereof horizontally when moved from side to side. Panning, on the other hand, may be implemented vertically, horizontally and diagonally in a manner similar to the cursor. For example, the mouse may be arranged to move the GUI or portions thereof vertically up when moved forward, and vertically down when moved backwards. In addition, the mouse may be arranged to move the GUI or portions thereof horizontally when moved from side to side. Moreover, the mouse may be arranged to move the GUI or portions thereof diagonally when moved both horizontally and side to side at the same time.

In the case of vertical scrolling/panning, when a user scrolls (or pans) down, each new set of data appears at the bottom of the viewing area and all other sets of data move up one position. If the viewing area is full, the top set of data moves out of the viewing area. Similarly, when a user scrolls (or pans) up, each new set of data appears at the top of the viewing area and all other sets of data move down one position. If the viewing area is full, the bottom set of data moves out of the viewing area. The same can be said for vertical scrolling/panning and diagonal panning (e.g., generally involves both X and Y). By way of example, the scrolling/panning feature may be used to help perform internet browsing, spreadsheet manipulation, viewing code, computer aided design, and the like.

Referring to FIGS. 3B and 3C, the scroll/pan control mode of the mouse 20 is actuated when the user's hand 34 is positioned away from the modal area 24 of the mouse 20. To elaborate, the palm side surface 36 of the hand 34 is placed on the back portion of the housing 22 and the thumb 38 and two rightmost fingers 40 (or leftmost fingers if left handed) are released from the sides of the housing 22. The two remaining fingers 42 (either by themselves or in combination) are also released from the top of the housing. In essence, the fingers 40, 42 and thumb 38 are positioned together in a substantially flat manner. Alternatively, the fingers 40 and/or 42 may rest on the top surface of the housing. In either case, the switch arrangement is configured to activate the scroll/pan control mode when the thumb 38 is positioned away from the modal area 24 (out of reach of the sensors). For example, the sensor of the switch arrangement does not detect the presence of the thumb 38 and in response, the mouse 20 (or general purpose computer 28) converts the position information of the tracking mechanism into scroll/pan position information.

To elaborate, the concept described in FIGS. 2 and 3 involves switching the meaning of mouse movement between tracking and scrolling/panning in an intuitive and natural way. In the tracking mode (as shown in FIGS. 2B&C), the user grips the mouse by gripping the sides of the mouse housing. To switch from cursor tacking mode (as shown in FIGS. 2B&C) to scrolling/panning mode (as shown in FIGS. 3B&C), the user simply lifts his or her fingers away from the sides of the mouse housing while maintaining contact with the top of the mouse housing. With the hand in this position any mouse movement imposed by the user will result in panning/scrolling of an active window on the screen of the display 30. To return to the tracking mode, the user simply grips the mouse as usual (as shown in FIGS. 2B&C). It should be appreciated, that the posture of the panning/scrolling hand (as shown in FIGS. 3B&C) is directly analogous to a posture used to pan a piece of paper on a real desk.

Figure 3D:
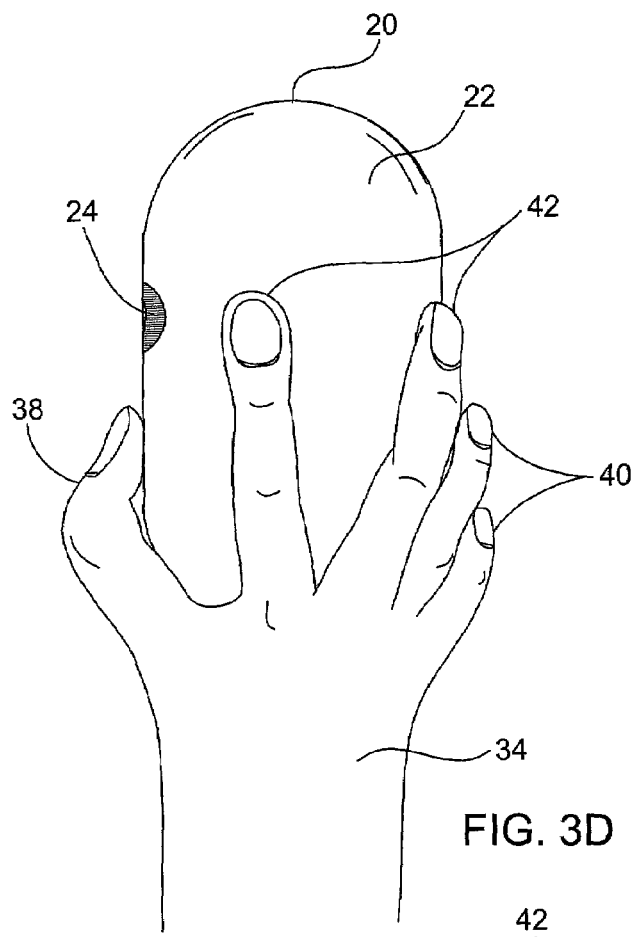
FIGS. 3D–3E show the mouse of FIG. 1 in a pan/scroll control mode, in accordance with one embodiment of the present invention.
Figure 3E:
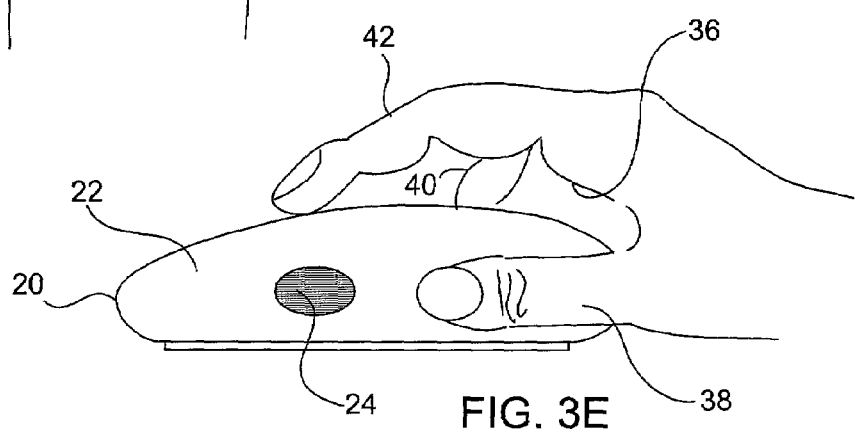

It should be noted that the hand position shown in FIGS. 3B and 3C is not a limitation and that it may vary according to the specific needs of each device or user of the device. For example, it should be appreciated that any hand position may be used to initiate the scroll/pan control mode so long as no portion of the hand (or some other object) is placed proximate the modal area. By way of example, FIGS. 3D and 3E show an alternate hand position which may be used to initiate the scroll/pan control mode. The alternate hand position may be similar to the hand position shown in FIGS. 2B and 2C with the thumb 38 position being positioned behind and away from the modal area 24 rather than over and proximate the modal area 24. In this particular embodiment, the palm side surface 36 of the hand 34 is spaced away from the back portion of the housing and the thumb 38 and two rightmost fingers 40 (or leftmost fingers if left handed) are used to grip the sides of the housing 22 behind the modal area 24. The two remaining fingers 42 (either by themselves or in combination) are used to initiate the clicking action from the top surface of the mouse housing 22.

FIGS. 4A and 4B are top views of a mouse 50, in accordance with one embodiment of the invention. By way of example, the mouse 50 may correspond to the mouse shown in FIGS. 1–3. FIG. 4A is a top view showing the mouse 50 being grasped by a pair of fingers 51 while FIG. 4B is a top view showing the mouse 50 without finger grasping. By way of example, FIG. 4A may generally correspond to FIGS. 2A–C and FIG. 4B may correspond to FIGS. 3A–3E. As shown in both figures, the mouse 50 includes a translucent mouse housing 52. By translucent, it is meant that light is free to pass therethrough. By way of example, the mouse housing 52 may be formed from a clear plastic material such as polycarbonate. The mouse 50 also includes a pair of proximity sensors 54 that are disposed inside the mouse housing 52. As shown, the proximity sensors 54 are positioned on opposite sides of the mouse 50. Each of the proximity sensors produces a modal area 56 that represents the working area of the sensors. The proximity sensors 54 are configured to detect the presence of a finger proximate the position of each of the proximity sensors 54 so as to provide signals for switching between GUI movements.

The proximity sensors 54 may be widely varied. For example, the proximity sensors may be optical, capacitance or any other type of proximity sensor. In the illustrated embodiment, the proximity sensors 54 are optical sensors based on infrared light that is invisible to the human eye. The optical sensors 54 include a light emitter (e.g., I-R emitter diode) 58 and a light detector 60 (e.g., I-R detector). The light emitter 58 is configured to shine a light beam 62 out the side of the mouse housing 52. When the fingers 51 (or other object) are present (as shown in FIG. 4A), the light 62 is reflected back to the light detector 60. That is, the light 62 passes through the housing 52, and hits the finger 51 thus causing the light 62 to be reflected back through the housing 52 and onto the detector 60. When the fingers 51 are not present (as shown in FIG. 4B), the light 62 is continuously directed away from the mouse housing 52. The light detectors 60 are generally configured to measure the light intensity of the light 62 that is reflected off of the fingers 51. When a substantial amount of light 62 is reflected back to the detector 60, the detector 60 produces a signal that may be used to activate or deactivate the GUI movements. In one implementation, the cursor control mode is activated when the detector 60 (or detectors) produces the signal, and the scroll/pan mode is activated when the detector 60 (or detectors) does not produce the signal (or vice versa).

The mouse also includes a positional movement detecting mechanism 66 for detecting movement of the mouse 50 along a surface. The positional movement detecting mechanism 66 produces positional signals that relate mouse movements to cursor or scrolling/panning movements on the display screen. The detecting mechanism may be a mechanical mechanism such as a trackball or an optical mechanism such as an optical sensor, both of which track the position of the mouse 50.

With regards to the track ball mechanism, a portion of the trackball generally protrudes from the underside of the housing while the remaining portion is housed within the mouse housing. As should be appreciated, the protruding portion of the trackball touches a flat surface on which the mouse 50 sits, thus causing the trackball to roll when the mouse 50 is moved along the surface. As the ball moves, it engages two rollers housed within the mouse 50. One of the rollers is oriented so that it detects motion in a first direction (e.g., X direction), and the other roller is oriented so that it detects motion in a second direction (e.g., Y direction), which is typically at a 90 degree angle relative to the first direction. By way of example, the first direction may relate to back and forth movements of the mouse, and the second direction may relate to side to side movements of the mouse. In most cases, the back and forth movements correspond to vertical movements in the GUI while side to side movements correspond to horizontal movements in the GUI. Each of the rollers is coupled to an encoder through a shaft so that when the rollers turn they spin the shaft and thus the encoders. The encoders may be mechanical encoders or optical encoders. The encoder is configured to generate signals based on the speed, distance and direction of the mouse as it is moved.

With regards to the optical mechanism, a light source (e.g., a light emitting diode (LED)) bounces light off the surface (over which the mouse moves) onto a camera type device (e.g., complimentary metal oxide semiconductor (CMOS)) that captures multiple images every second of the surface. The images are used to generate signals based on the speed, distance and direction of the mouse as it is moved. Both trackball and optical tracking mechanisms are well known in the art and for the sake of brevity will not be discussed in greater detail.

The mouse 50 also includes a processor 70 for processing the signals sent by the sensors 54 and position movement detecting mechanism 66. The processor 70 is typically configured to turn these signals into data, which can be used by a host system (e.g., computer system). By way of example, and referring to FIG. 5, the processor 70 may separately send a position data 72 associated with the X, Y movements of the mouse 50 and command data 74 associated with the activation of the GUI movements (e.g., scroll/pan or cursor) to the host system. Alternatively and referring to FIG. 6, the processor 70 may group the position and command data 72, 74 together. Although not shown, the processor may also receive signals from the buttons of the mouse.

FIG. 7 is a function diagram 80, in accordance with one embodiment of the present invention. The function diagram 80 is arranged to illustrate one way in which the mouse 50 shown in FIGS. 4A–B may be configured. As shown, the function diagram 80 includes a first detector block D1 and a second detector block D2. Each of the detector blocks D1, D2 represents a signal based on the detection of a finger. Zeros are used to represent when the sensors don't detect the presence of a finger and ones are used to represent when the sensors detect the presence of a finger. By way of example, D1 may represent the sensor on the right of the mouse shown in FIG. 4 and D2 may represent the sensor on the left of the mouse shown in FIG. 4. The function diagram also includes a function block. The function block represents the function that is implemented for the various signals of the detectors. In this particular embodiment, the mouse is configured to provide scrolling/panning control when both signals are zero and cursor control when any of the other combinations are produced (e.g., 0-1, 1-0, 1—1).

It should be noted, however, that the function diagram of FIG. 7 is not a limitation and that the mouse may be arranged differently. For example, a zero zero combination may produce cursor control while any of the other combinations may produce scrolling/panning control. Or a zero—zero combination may produce panning control, zero-one may produce horizontal scroll, one-zero may produce vertical scroll, and one—one may produce cursor control. Furthermore, the functions may be used for tasks not associated with GUI movements. By way of example, the functions may be related to actions such as selecting an item on the screen, opening a file or document, executing instructions, starting a program, viewing a menu, and/or the like. In one implementation, the signal interpretation is programmable so as to allow a user to control the type and number of functions implemented by the mouse (to better match the desires of the user). For example, a right handed user may want to configure the mouse differently than a left handed user. In addition, a more skilled user may want to configure the mouse differently than a less skilled user (e.g., they may want to add more functionality to the mouse). Moreover, users may grasp the mouse differently thus they may want to use the mouse functions differently. In one embodiment, a control panel may be used to allow a user to program the functionality of the mouse. For example, the control panel may include enable/disable selections, or specific configurations.

Figure 8:
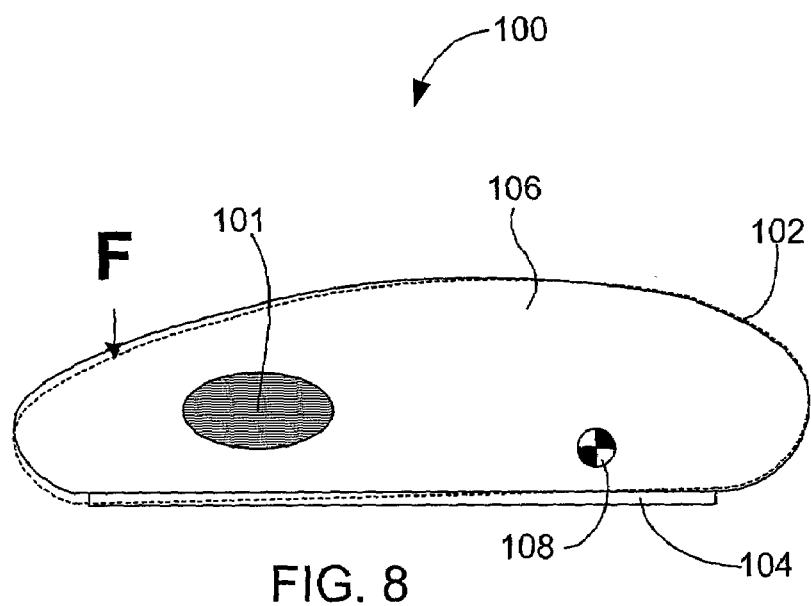
FIG. 8 is side view of a mouse, in accordance with one embodiment of the present invention.

FIG. 8 is a side view of a unibody mouse 100 that provides a modal area 101, in accordance with one embodiment of the invention. By way of example, the unibody mouse 100 may correspond to the mice shown in FIGS. 1–4. The unibody mouse 100 generally includes a mouse housing 102 that provides a structure for moving the mouse 100 along a surface, for gripping the mouse 100 for movement thereof and for implementing at least one button function of the mouse 100. The term "unibody" herein refers to a mouse that integrates at least one button function directly into the mouse housing 102, i.e., pressing on the mouse housing 102 creates a clicking action. As such, any part of the hand, from finger to thumb to palm, can trigger a clicking action. In a unibody mouse, the button functionality and a substantial portion of the housing are combined as opposed to attaching separate mechanical button to or through the housing.

The mouse housing 102 may be widely varied. In the illustrated embodiment, the mouse housing 102 includes a base 104 and a button body 106. The base 104 is configured to moveably support the mouse 100 during use thereof, i.e., the base 104 makes moving contact with a surface such as a desktop or mouse pad. The button body 106, on the other hand, is configured to move relative to the base 104 so as to provide a clicking action that implements the button functionality of the mouse 100. The entire surface of the body 106 above the base 104 acts as a single or multiple button. The clicking action (e.g., the movement of the body 54 relative to the base 104) may be provided through one or more degrees of freedom (DOF). The degrees of freedom may be implemented through one or more rotations, pivots, translations, flexes (and/or the like) relative to the base 104. In the illustrated embodiment, the button body 106 is pivotally coupled to the base 104.

As shown, the body 106 pivots about an axis 108. In this example, the body 106 is capable of moving between a first position (shown by a solid line) and a second position (shown by a dotted line) when a force F is applied to the body 106. The force F may be any downward force on the mouse 100, whether from a finger, palm or hand that results in a clicking action. In one implementation, the button body 106 may be spring biased so as to place the button body 106 in an unactuated position such as for example the first position shown by the solid lines. In most cases, a switch is located underneath the housing 102. The switch is configured to provide a signal when the body 106 is moved form the first to the second position. In one embodiment, the button functions of the housing 102 are implemented via switches or sensors located inside the mouse housing 102. The switches and sensors are generally configured to provide pulsed or binary data such as activate (on) or deactivate (off). For example, an underside portion of the body 106 may be configured to contact or engage (and thus activate) a switch when the user presses on the body 106.

By way of example, a representative unibody mouse is described in U.S. patent application Ser. No. 09/482,152, titled "CURSOR CONTROL DEVICE HAVING AN INTEGRAL TOP MEMBER", filed Jan. 12, 2000, which is incorporated herein by reference.

Figure 9:
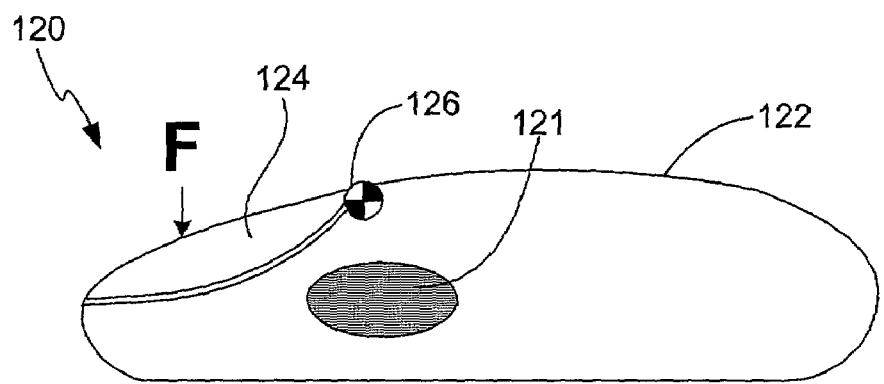
FIG. 9 is a side view of a mouse, in accordance with one embodiment of the present invention.

FIG. 9 is a side view of a mouse 120 that provides a modal area 121, in accordance with one embodiment of the invention. By way of example, the mouse 120 may correspond to the mice shown in FIGS. 1–4. The mouse 120 includes a housing 122 and a button cap 124 that moves relative to the housing 122 so as to provide a clicking action that implements the button functionality of the mouse 120. In the illustrated embodiment, the button cap 124 is pivotally coupled to the housing 122 about an axis 126. In this example, the button cap 124 is capable of moving between a first position and a second position when a force F is applied to the button cap 124. The force F may be any downward force on the button cap 124 that results in a clicking action (e.g., finger). In most cases, a switch is located underneath the button cap 124. The switch is configured to provide a signal when the button cap 124 is moved form the first to the second position. Switches are generally configured to provide pulsed or binary data such as activate (on) or deactivate (off). By way of example, an underside portion of the button cap may be configured to contact or engage (and thus activate) a switch when the user presses on the button cap 124.

Figure 10:
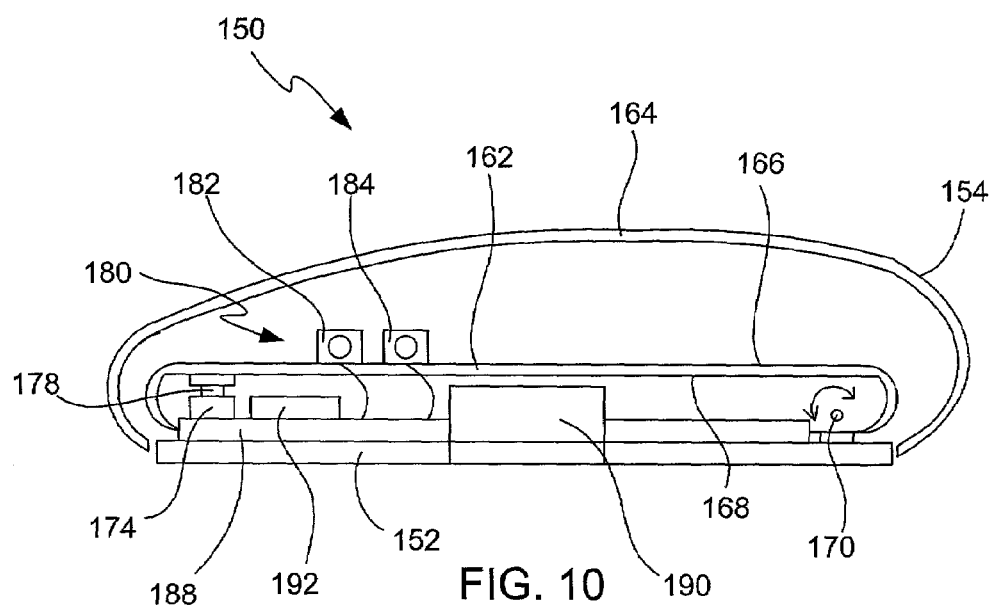
FIG. 10 is a side view, in cross section, of a mouse, in accordance with one embodiment of the present invention.

FIG. 10 is a side elevation view, in cross section, of a mouse 150, in accordance with one embodiment of the present invention. By way of example, the mouse 150 may generally correspond to the mouse 100 shown in FIG. 8. For example, the mouse 100 generally includes a base 152 and a body 154 that may correspond to the base 104 and body 106 of the mouse 100. Broadly, the base 152 provides a platform for sliding the mouse 150 along a surface and for supporting the other components of the mouse 150, as for example, the body 154. The body 154, which is pivotally coupled to the base 152, provides a clicking action for selecting and executing actions on the GUI. As should be appreciated, the body 154 is the button of the mouse 150 and therefore the body 154 has no separate mechanical buttons disposed thereon.

More specifically, the body 154 includes an inner shell 162 and an outer shell 164. The outer shell 164 is structurally coupled to the inner shell 162. The means for coupling the outer shell 164 to the inner shell 162 is not shown herein, however, any suitable coupling means may be used. By way of example, the outer shell 164 may be coupled to the inner shell 162 via fasteners such as snaps, screws, glues and the like. Alternatively, the inner and outer shell 162, 164 may be integrally formed from a single piece of material.

The inner and outer shells 162, 164, as well as the base 152, are generally formed from a suitable material such as plastic. In one implementation, the outer shell 164 is formed from a translucent material so that the inner shell 162 may be visible to a user. As shown, the inner shell 162 is disposed between the base 152 and the outer shell 164. As such, the inner shell includes a top surface 166, which substantially faces the inner surface of the outer shell 164 and a bottom surface 168 that substantially faces the base 152.

The inner shell 162 is pivotally coupled to the base 152 via a pivot 170 located towards the rear of the mouse 150. By way of example, the pivot 170 may include a pivot support attached to the base 152, and the inner shell 162 may include an internal pivot pin for mating with an opening in the pivot support. The pivot 170 allows the body 154 to swing between an unclicked position, placing the body 154 away from the base 152, and a clicked position, placing the body 154 towards the base 152. In the clicked position (e.g., when a downward force is applied to the body 154), the inner shell 162 is configured to engage a switch 174 located opposite the pivot 170. That is, during the clicking action, a bottom portion 168 of the inner shell 162 is pushed against an actuator 178 of the switch 174 thereby activating the switch 174, i.e., the actuator 178 is configured to move between a deactivate position (e.g., upright) and an activate position (e.g., depressed). The switch is configured to produce a command signal such as a data selection or execution command signal when the switch is activated.

The inner shell 162 is also configured to carry a sensor 180. The sensor 180 may be disposed inside the inner shell 162 (if translucent) or outside the inner shell 162 (if opaque). In the illustrated embodiment, the sensor 180 is positioned on the outside of the inner shell 162. The sensor 180 is adapted to detect the presence of an object such as a user's hand when the object is located within the working area of the sensor 180. The sensor 180 allows a user to select the type of GUI movement by readjusting the position of the hand on the body 154. For example, the user may select a cursor control mode by placing their hand in a first position or the user may select a scroll/pan mode by placing a their hand in a second position. As shown, the sensor 180 includes a light emitter 182 and a light detector 184. The light emitter 182 is configured to direct light out of the side of the translucent outer shell 164 so that it may be reflected back to the detector 184 when an object is placed in its line of path. The sensor 180 is configured to produce a first command signal when the detector 184 detects the reflected light, and a second command signal when the detector 184 does not detect the light.

As shown, the inner shell 162 and base 152 form a space therebetween that is used to enclose various internal components. For example, a printed circuit board 188 is typically disposed therebetween. A majority of the internal electronics of the mouse 150 are connected to the printed circuit board 188. For example, the printed circuit board 188 may carry the switch 174, a position detection device 190 (e.g., trackball, optical sensor), a processor 192 and the like. The sensor 180, position detection device 190 and switch 124 are typically operatively coupled to the processor 192, i.e., the processor receives and processes the signals from the devices. Although not shown, the mouse 150 generally includes a cable for connecting the internal electronics to a host system (e.g., computer system). One end of the cable is permanently connected to the internal electronics such as the processor 192, and the other end includes a connector for removably coupling the mouse to the host system. By way of example, the connector may be a PS/2 connector, a serial connector, a USB connector and the like. Alternatively, the mouse may include a radio frequency (RF) link or optical infrared (IR) link to eliminate the need for a cable.

Figure 11:
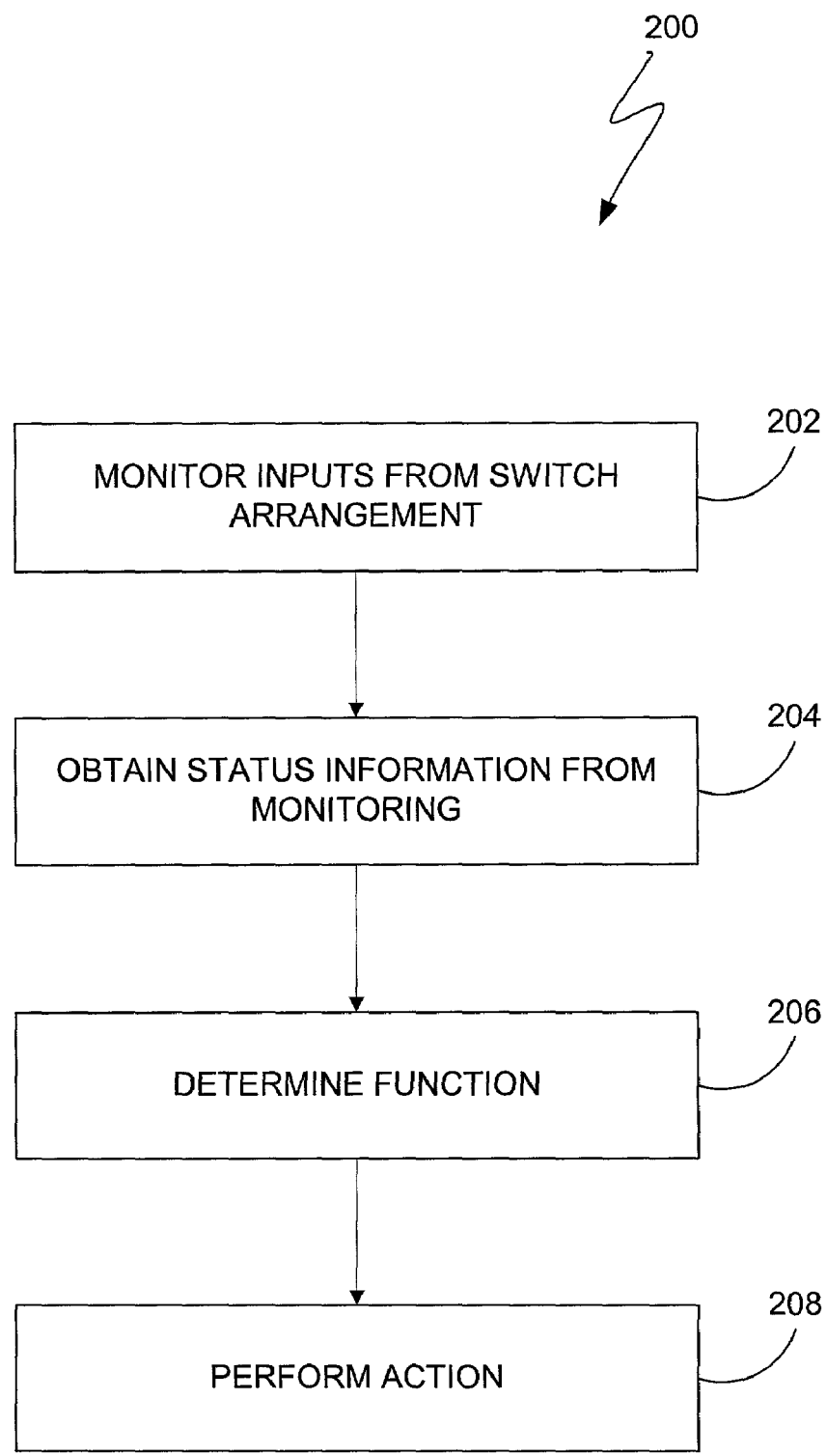
FIG. 11 is a flow diagram of mouse processing, in accordance with one embodiment of the present invention.

FIG. 11 is a flow diagram of mouse processing 200, in accordance with one embodiment of the invention. The mouse processing 200 may be performed by a mouse or by a computer system (or computer) connected to the mouse. In one embodiment, the computer system corresponds to a general purpose computer such as an IBM compatible computer or Apple computer.

The mouse processing 200 generally begins at block 202 where inputs from a switch arrangement are monitored. Here, one or more states associated with the switch arrangement can be monitored. By way of example, the states being monitored can include cursor control mode, scroll/pan mode or other modes. After block 202, the process proceeds to block 204 where status information associated with the states are obtained from the monitoring. By way of example, the status information may correspond to which of the states are activated (e.g., on or off).

After block 204, the process proceeds to block 206 where functions of the states are determined. The functions of the states are generally based on the status information and predetermined configuration information. In one embodiment, the predetermined configuration information identifies a type and nature of function that is to be provided for a specific status information. By way of example, a cursor control action may be identified when the switch arrangement is activated. In addition, a scroll/pan action may be identified when the switch arrangement is deactivated. Moreover, an on screen action such as selecting an item on the screen may be identified when the switch arrangement is activated or deactivated.

In one embodiment, the predetermined configuration information is stored in memory. Thus, the computer consults the information held in memory in order to determine the on-screen action for a specific clicking action. The predetermined configuration information stored in the memory may be accessed by a user through a mouse control menu, which may be viewed on a display screen as part of a GUI interface. The mouse control menu may include control settings pertaining to one or more on screen actions. In fact, the mouse control menu may serve as a control panel for reviewing and/or customizing the mouse control settings, i.e., the user may quickly and conveniently review the mouse control settings and make changes thereto. Once the user saves the changes, the modified mouse control settings will be employed (e.g., as predetermined configuration information) to handle future events transmitted and/or received through the computer.

After the functions have been determined, the process proceeds to block 210 where the actions are performed. For example, the cursor control action may allow a cursor to be moved on the screen, the scroll/pan action may allow a user to scroll/pan through the display screen. Additionally, on screen actions may select an item on the screen, open a file or document, execute instructions, start a program, view a list of commands (or system properties), or the like. Thereafter, the process can proceed back to block 202 where switch arrangement inputs are monitored.

Figure 12:
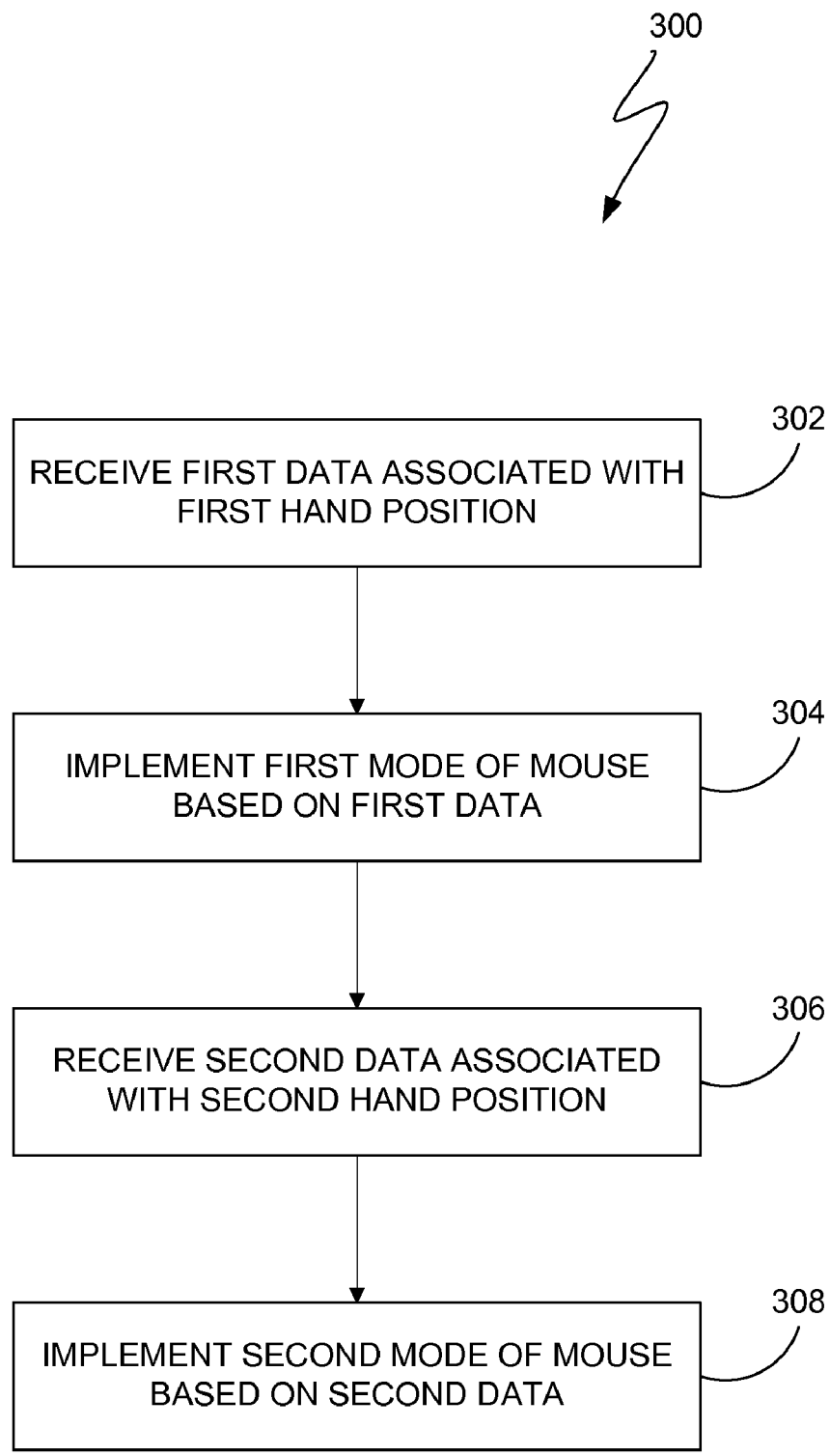
FIG. 12 is a flow diagram of mode switching, in accordance with one embodiment of the present invention.

FIG. 12 is a flow diagram of a mode switching method 300, in accordance with one embodiment of the invention. The mode switching method generally correspond to switching between a first mode and a second mode of a mouse. By way of example, the first mode may correspond to a cursor control mode and the second mode may correspond to a scroll/pan mode.

The mode switching method 300 generally begins at block 302 where a first data associated with a first hand position are received. By way of example, the first data may be produced by the sensors and received by the processor described in FIG. 4. Furthermore, the first hand position may correspond to the hand position shown in FIGS. 2B and 2C.

After block 302, the process proceeds to block 304 where the first mode of the mouse is implemented based on the first data. The first mode may be implemented by the processor of the mouse shown in FIG. 4. By way of example, the processor may interpret the first data and send a signal based on the interpretation to a computer system to which the mouse is connected (see for example FIG. 6). Alternatively, the first mode may be implemented by the computer system to which the mouse is connected. By way of example, the processor may pass the first data to the computer system so as to allow the computer system to interpret the first data (see for example FIG. 5).

After block 304, the process proceeds to block 306 where a second data associated with a second hand position is received. By way of example, the second data may be produced by the sensors and received by the processor described in FIG. 4. Furthermore, the second hand position may correspond to the hand position shown in FIGS. 3B and 3C or 3D and 3E.

After block 306, the process proceeds to block 308 where the second mode of the mouse is implemented based on the second data. The second mode may be implemented by the processor of the mouse shown in FIG. 4. By way of example, the processor may interpret the second data and send a signal based on the interpretation to a computer system to which the mouse is connected (see for example FIG. 6). Alternatively, the first mode may be implemented by the computer system to which the mouse is connected. By way of example, the processor may pass the second data to the computer system so as to allow the computer system to interpret the second data (see for example FIG. 5).

The advantages of the invention are numerous. Different embodiments or implementations may have one or more of the following advantages. One advantage of the invention is that the mouse requires no obvious button to actuate the mode change. Buttons break the surface of the mouse and are therefore less aesthetically pleasing. Another advantage of the invention is that the user changes modes by a simple and natural posture change of the hand and is not required to hold down a button to maintain the desired mode. In this regard, the mouse appears almost modeless. Another advantage of the invention is that the mode mechanism is not obvious to the user and therefore the device works in a magical manner.

While this invention has been described in terms of several preferred embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A mouse for controlling movements on a display screen, the mouse comprising:
   a housing that is gripped by a user during manipulation of the mouse;
   a positional movement detection mechanism for detecting movement of the mouse relative to a surface upon which it is supported, and producing position signals that relate mouse movements relative to the surface upon which it is supported to cursor or scrolling/panning movements on the display screen, the position signals only controlling cursor movements on the display screen when the mouse is in a cursor control mode, the position signals only controlling scrolling/panning movements on the display screen when the mouse is in a pan/scroll control mode; and
   a sensor configured to detect the presence of an object located outside of and in close proximity to a predetermined portion of the side of the housing, the sensor providing a means for switching between the pan/scroll control mode and a cursor control mode of the mouse, the cursor control mode being implemented when and as long as, an object is detected at the predetermined portion of the housing such that mouse movements relative to the surface upon which it is supported move the cursor on the display screen, the pan/scroll control mode being implemented when an object is not detected at the predetermined portion of the housing such that mouse movements relative to the surface upon which it is supported produce panning/scrolling functions on the display screen, wherein both modes cannot be implemented simultaneously, and wherein the sensor is not configured to detect movements of the object.

2. The mouse as recited in claim 1 wherein the sensor is an optical sensor.

3. The mouse as recited in claim 2 wherein the optical sensor is based on infrared sensing technology.

4. The mouse as recited in claim 3 wherein the optical sensor emits infrared light and detects infrared light that reflects off the object.

5. The mouse as recited in claim 4 wherein the optical sensor is disposed inside the housing.

6. The mouse as recited in claim 5 wherein the housing is formed from a material that allows the passage of infrared light.

7. The mouse as recited in claim 6 wherein the housing is formed from a translucent material.

8. The mouse as recited in claim 1 wherein the sensor is configured to detect the presence of a user gripping the predetermined portion of the housing.

9. The mouse as recited in claim 8 wherein the mouse switches between a pan/scroll mode and a cursor mode by identifying the position of a user's hand relative to the predetermined portion of the housing during manipulation of the mouse.

10. The mouse as recited in claim 9 wherein the predetermined portion is on the side of the housing.

11. The mouse as recited in claim 10 wherein the cursor control mode is implemented when the user grips the side of the mouse.

12. The mouse as recited in claim 1 wherein the sensor is configured to detect the presence of a user's finger located outside of and in close proximity to the predetermined portion of the housing.

13. The mouse as recited in claim 1 wherein the sensor provides a means for implementing a button function of the mouse.

14. The mouse as recited in claim 1 wherein the housing includes a base for moveably supporting the mouse on a surface and a body carried by the base for allowing the mouse to be held by the user.

15. The mouse as recited in claim 14 wherein the body is movably coupled to the base so as to provide one or more clicking actions for performing actions on the display screen.

16. The mouse as recited in claim 14 wherein the rouse includes a mechanical button that is disposed in the body, the mechanical button providing one or more clicking actions for performing actions on the display screen.

17. The mouse as recited in claim 1 wherein the housing providing a first and second surface for gripping the mouse during manipulation of the mouse, and a third surface for moveably supporting the mouse on a surface during manipulation of the mouse.

18. The mouse as recited in claim 17 wherein the predetermined portion of the housing is located within the first surface.

19. The mouse as recited in claim 18 wherein the first surface is gripped by the pinching fingers of the user, and wherein the second surface is gripped by the palm of the user.

20. A computer mouse comprising:
a sensor unit configured to sense whether the mouse is being held by a user in a first hand position that indicates a cursor control mode of operation of the mouse, or whether the mouse is being held by a user in a second hand position that indicates a pan/scroll control mode of operation of the mouse, wherein the modes cannot be implemented simultaneously; and
a positional movement detection mechanism for producing position signals that relate mouse movements relative to the surface upon which it is supported to cursor or scrolling/panning movements on the display screen, wherein the position signals control cursor movements on the display screen when the mouse is in the cursor control mode and scrolling/panning movements on the display screen when the mouse is in the pan/scroll control mode.

21. The computer mouse as recited in claim 20 wherein the mouse includes one or more sensors configured to detect the presence of one or more portions of a user's hand proximate to predetermined areas of the mouse when the user's hand is used to hold the mouse during manipulation thereof.

22. The computer mouse as recited in claim 21 wherein the sensors are optical sensors that are disposed inside a translucent housing of the mouse, the optical sensors being configured to work through the translucent housing, the translucent housing providing a structure for gripping the mouse for movement thereof.

23. A computer mouse, comprising:
a sensor unit based on infrared sensing technology configured to sense whether the mouse is being held by a user in a first hand position that indicates a cursor control mode of operation of the mouse, or whether the mouse is being held by a user in a second hand position that indicates a pan/scroll control mode of operation of the mouse, wherein the modes cannot be implemented simultaneously; and
a positional movement detection mechanism for producing position signals that relate mouse movements relative to the surface upon which it is supported to cursor or scrolling/panning movements on the display screen, wherein the position signals control cursor movements on the display screen when the mouse is in the cursor control mode and scrolling/panning movements on the display screen when the mouse is in the pan/scroll control mode.

24. The mouse as recited in claim 23 wherein the mouse includes a housing having a light passing portion and an infrared sensor that works through the light passing portion, the infrared sensor including an I-R light emitter configured to shine a light beam through the light passing portion and an I-R light detector configured to measure the intensity of light that is reflected back through the light passing portion by an object positioned in front of the light beam.

25. The mouse as recited in claim 24 wherein the light detector produces a signal for activating or deactivating a panning and scrolling function of the mouse, the signal being based on the measured light intensity.

26. A method of switching between modes during operation of a computer mouse that is manipulated by the hand of a user, the method comprising:
receiving a fist data associated with a first hand position for holding the mouse;
implementing a cursor control mode of the mouse based on the fist data;
receiving a second data indicating a change of the first hand position to a second hand position for holding the mouse; and
implementing a pan/scroll control mode of the mouse based on the second data, wherein the modes cannot be implemented simultaneously and wherein in the cursor mode, mouse movements relative to a surface upon which it is supported control cursor movements on a display screen and wherein in the pan/scroll mode, mouse movements relative to the surface upon which it is supported controls scrolling/panning movements on the display screen.

27. A mouse for controlling movements and performing actions on a graphical user interface of a display screen, the mouse comprising:
a housing that provides a structure for moving the mouse along a surface and for gripping the mouse for movement thereof the housing having a light passing portion;
a tracking assembly disposed at least in part inside the housing and configured to track movements of the mouse along a surface, the movements of the mouse being used to control cursor movements and scroll/pan movements through the graphical user interface; and
a switch assembly disposed inside the housing and configured to switch the mouse during operation between a cursor control mode, where movements of the mouse are used to control movements of a cursor, and a scroll/pan control mode, where movements of the mouse are used to control scroll or pan movements, the switch assembly including an optical sensor configured to detect the presence of a user's hand through a light passing portion disposed on a side surface of the housing so as to activate one of the GUI movements, wherein the modes cannot be implemented simultaneously.

28. The mouse as recited in claim 1 wherein the sensor is a capacitance sensor.

29. The mouse as recited in claim 1 wherein the mouse includes a pair of proximity sensors disposed inside the housing, the proximity sensors of the pair of proximity sensors being positioned on opposite sides of the mouse, and producing a modal area that represents the working area of the sensors at the surface of the housing, the proximity sensors being configured to detect the presence of a finger proximate the position of each of the proximity sensors and to generate control signals indicative thereof.

30. The mouse as recited in claim 29 wherein at least a portion of the housing is translucent, and wherein the proximity sensors are optical sensors that include a light emitter and a light detector, the light emitter being configured to direct a light beam out the side of the housing, the light detectors being configured to detect light that is reflected back from the side of the housing when a finger is placed thereon.

31. The mouse as recited in claim 30 wherein a cursor control mode is activated when the light detector senses reflected light, and wherein a scroll/pan mode is activated when the light detector does not sense reflected light.

32. The method as recited in claim 26 wherein the first mode is a cursor control mode, and wherein the second mode is a scroll/pan mode.

33. The method as recited in claim 26 wherein the first hand position for holding the mouse includes placing the hand over the mouse and gripping the sides of the mouse between the thumb and one of the outermost fingers, and wherein the second hand position for holding the mouse includes removing the thumb and one of the outermost fingers from the sides of the mouse.

34. The mouse as recited in claim 27 wherein the mouse includes a pair of optical sensors, a first optical sensor being configured to detect the presence of a finger at the right side of the mouse and to generate signals indicative thereof, a second optical sensor being configured to detect the presence of a finger at the left side of the mouse and to generate signals indicative thereof, and wherein each of the optical sensors includes a light emitter and a light detector, the light emitter being configured to direct a light beam out the side of the housing, the light detectors being configured to detect light that is reflected back from the side of the housing when a finger is placed thereon, and wherein the signals generated by the optical sensors indicate whether the mouse is in the cursor control mode or the scroll/pan mode.

35. The method as recited in claim 20 wherein the first mode is a cursor control mode, and wherein the second mode is a scroll/pan mode.

36. A mouse for controlling movements on a display screen, the mouse comprising:

a housing that is gripped by a user during manipulation of the mouse;

a positional movement detection mechanism for detecting movement of the mouse relative to a surface upon which it is supported, and producing position signals that relate mouse movements relative to the surface upon which it is supported to a first operation or a second operation on the display screen, the position signals only controlling first operation functions on the display screen when the mouse is in a first operation control mode, the position signals only controlling second operation functions on the display screen when the mouse is in a second operation control mode; and a sensor configured to detect the presence of a object located outside of and in close proximity to a predetermined portion of the side of the housing, the sensor providing a means for switching between the first operation control mode and the second operation control mode of the mouse, the fist operation control mode being implemented when, and as long as, an object is detected at the predetermined portion of the housing such that mouse movements relative to the surface upon which it is supported control the first operation functions on the display screen, the second operation control mode being implemented when an object is not detected at the predetermined portion of the housing such that mouse movements relative to the surface upon which it is supported control the second operation functions on the display screen, and wherein both modes cannot be implemented simultaneously.

* * * * *

UNITED STATES PATENT AND TRADEMARK OFFICE
CERTIFICATE OF CORRECTION

PATENT NO. : 7,168,047 B1  Page 1 of 1
APPLICATION NO. : 10/157343
DATED : January 23, 2007
INVENTOR(S) : Brian Q. Huppi It is certified that error appears in the above-identified patent and that said Letters Patent is hereby corrected as shown below:

In the Claims:

In line 1 of claim 16 (column 15, line 16) change "rouse" to --mouse--.

In line 4 of claim 26 (column 16, line 28) change "fist" to --first--.

In line 7 of claim 26 (column 16, line 31) change "fist" to --first--.

In line 21 of claim 36 (column 18, line 29) change "fist" to --first--.

Signed and Sealed this

Second Day of October, 2007

JON W. DUDAS
*Director of the United States Patent and Trademark Office*